United States Patent
Li et al.

(10) Patent No.: US 12,341,712 B2
(45) Date of Patent: Jun. 24, 2025

(54) METHODS AND APPARATUS FOR MULTI-CARRIER COMMUNICATIONS WITH VARIABLE CHANNEL BANDWIDTH

(71) Applicant: Intellectual Ventures II LLC, Wilmington, DE (US)

(72) Inventors: Xiaodong Li, Kirkland, WA (US); Titus Lo, Bellevue, WA (US); Kemin Li, Bellevue, WA (US); Haiming Huang, Bellevue, WA (US)

(73) Assignee: Intellectual Ventures II LLC, Wilmington, DE (US)

( * ) Notice: Subject to any disclaimer, the term of this patent is extended or adjusted under 35 U.S.C. 154(b) by 221 days.

(21) Appl. No.: 17/390,407

(22) Filed: Jul. 30, 2021

(65) Prior Publication Data

US 2021/0376970 A1    Dec. 2, 2021

Related U.S. Application Data

(60) Continuation of application No. 16/715,995, filed on Dec. 16, 2019, now Pat. No. 11,082,172, which is a
(Continued)

(51) Int. Cl.
*H04L 5/00* (2006.01)
*H04L 5/14* (2006.01)
(Continued)

(52) U.S. Cl.
CPC ......... *H04L 5/0007* (2013.01); *H04L 5/0028* (2013.01); *H04L 5/0041* (2013.01);
(Continued)

(58) Field of Classification Search
CPC ........ H04J 1/00; H04J 1/02; H04J 1/04; H04J 1/06; H04J 1/08; H04L 5/0007;
(Continued)

(56) References Cited

U.S. PATENT DOCUMENTS

| 5,097,499 A | 3/1992 | Cosentino |
| 5,761,190 A | 6/1998 | Yamauchi et al. |

(Continued)

FOREIGN PATENT DOCUMENTS

| DE | 19800953 C1 | 7/1999 |
| EP | 0869647 | 10/1998 |

(Continued)

OTHER PUBLICATIONS

US 5,557,264 A, 11/1996, Tuohino (withdrawn)
(Continued)

*Primary Examiner* — Khoa Huynh
(74) *Attorney, Agent, or Firm* — Volpe Koenig

(57) ABSTRACT

A mobile station using orthogonal frequency division multiple access (OFDMA). The frequency processing circuitry and the processor of the mobile station are configured to scan spectral bands for a first signal. The first signal having synchronization and cell identification information, and is received in a first band of a cell having a full bandwidth. The first band being within a first bandwidth part and the first bandwidth part being a portion of the full bandwidth of a cell that comprises a plurality of bandwidth parts. Further, the frequency processing circuitry and the processor configured to receive and process signals in the first bandwidth part and configured to switch to receive and process a second bandwidth part, the second bandwidth part being different frequency size than the first bandwidth part.

12 Claims, 10 Drawing Sheets

Related U.S. Application Data continuation of application No. 15/727,831, filed on Oct. 9, 2017, now Pat. No. 10,511,417, which is a continuation of application No. 14/505,913, filed on Oct. 3, 2014, now abandoned, which is a division of application No. 12/870,617, filed on Aug. 27, 2010, now Pat. No. 8,953,641, which is a continuation of application No. 10/583,534, filed as application No. PCT/US2005/014828 on Apr. 29, 2005, now Pat. No. 7,787,431.

(60) Provisional application No. 60/567,233, filed on May 1, 2004.

(51) Int. Cl.
| | | |
|---|---|---|
| *H04W 72/23* | (2023.01) | |
| *H04W 72/30* | (2023.01) | |
| *H04L 27/26* | (2006.01) | |
| *H04W 48/16* | (2009.01) | |
| *H04W 72/00* | (2023.01) | |
| *H04W 76/10* | (2018.01) | |

(52) U.S. Cl.
CPC .......... *H04L 5/0044* (2013.01); *H04L 5/0064* (2013.01); *H04L 5/1469* (2013.01); *H04W 72/23* (2023.01); *H04W 72/30* (2023.01); *H04L 5/0021* (2013.01); *H04L 5/0048* (2013.01); *H04L 5/0094* (2013.01); *H04L 27/2613* (2013.01); *H04W 48/16* (2013.01); *H04W 72/00* (2013.01); *H04W 76/10* (2018.02)

(58) Field of Classification Search
CPC ... H04L 5/0021; H04L 5/0028; H04L 5/0041; H04L 5/0042; H04L 5/0044; H04L 5/0048; H04L 5/0064; H04L 5/0094; H04L 5/1469; H04L 27/2613; H04W 48/16; H04W 72/00; H04W 72/005; H04W 72/042; H04W 72/23; H04W 72/30; H04W 76/02; H04W 76/10
See application file for complete search history.

(56) References Cited

U.S. PATENT DOCUMENTS

| | | | |
|---|---|---|---|
| 5,801,773 | A | 9/1998 | Ikeda |
| 5,793,757 | A | 11/1998 | Uddenfeldt |
| 5,864,546 | A | 1/1999 | Campanella |
| 5,889,816 | A | 3/1999 | Agrawal et al. |
| 5,991,308 | A | 11/1999 | Fuhrmann et al. |
| 6,091,781 | A | 7/2000 | Mujtaba |
| 6,094,576 | A | 7/2000 | Hakkinen et al. |
| 6,137,785 | A | 10/2000 | Bar-Ness |
| 6,175,550 | B1 | 1/2001 | Van Nee |
| 6,243,424 | B1 | 6/2001 | Kroeger et al. |
| 6,289,203 | B1 | 9/2001 | Smith et al. |
| 6,598,155 | B1 | 7/2003 | Ganapathy et al. |
| 6,611,289 | B1 | 8/2003 | Yu et al. |
| 6,721,569 | B1 | 4/2004 | Hashem et al. |
| 6,795,407 | B2 | 9/2004 | Chesson |
| 6,904,283 | B2 | 6/2005 | Li et al. |
| 6,925,067 | B2 | 8/2005 | Jou |
| 6,940,827 | B2 | 9/2005 | Li et al. |
| 6,943,837 | B1 | 9/2005 | Booth, Jr. |
| 7,100,194 | B1 | 8/2006 | Unger |
| 7,110,349 | B2 | 9/2006 | Branlund et al. |
| 7,305,043 | B2 | 12/2007 | Milbar et al. |
| 7,372,909 | B2 | 5/2008 | Miyoshi |
| 7,376,424 | B2 | 5/2008 | Kim et al. |
| 7,397,859 | B2 | 7/2008 | McFarland |
| 7,400,898 | B2 | 7/2008 | Kang et al. |
| 7,426,175 | B2 | 9/2008 | Zhuang et al. |
| 7,515,559 | B2 | 4/2009 | Koo et al. |
| 7,551,675 | B2 | 6/2009 | Kroeger |
| 7,620,028 | B2 | 11/2009 | Husted et al. |
| 7,738,437 | B2 | 6/2010 | Ma et al. |
| 7,782,750 | B2 | 8/2010 | Yamaura et al. |
| 7,787,431 | B2 | 8/2010 | Li et al. |
| 7,908,172 | B2 | 3/2011 | Corts et al. |
| 7,916,803 | B2 | 3/2011 | Gardner et al. |
| 8,000,675 | B2 | 8/2011 | Sanders et al. |
| 8,953,641 | B2 | 2/2015 | Li et al. |
| 2002/0006167 | A1 | 1/2002 | McFarland |
| 2002/0012071 | A1 | 1/2002 | Sun |
| 2002/0015477 | A1 | 2/2002 | Geile et al. |
| 2002/0018527 | A1 | 2/2002 | Vanderaar et al. |
| 2002/0041635 | A1 | 4/2002 | Ma |
| 2002/0055356 | A1 | 5/2002 | Dulin et al. |
| 2002/0090909 | A1 | 7/2002 | Dapper et al. |
| 2002/0103013 | A1 | 8/2002 | Watson et al. |
| 2002/0111142 | A1 | 8/2002 | Klimovitch |
| 2002/0141355 | A1 | 10/2002 | Struhsaker et al. |
| 2002/0142777 | A1 | 10/2002 | McGovern et al. |
| 2002/0159414 | A1 | 10/2002 | Kanemoto et al. |
| 2002/0159422 | A1 | 10/2002 | Li et al. |
| 2002/0159426 | A1 | 10/2002 | Kanemoto et al. |
| 2002/0177446 | A1 | 11/2002 | Bugeja |
| 2002/0181509 | A1 | 12/2002 | Mody et al. |
| 2003/0053410 | A1 | 3/2003 | Williams et al. |
| 2003/0093530 | A1 | 5/2003 | Syed |
| 2003/0103445 | A1 | 6/2003 | Steer et al. |
| 2003/0162535 | A1 | 8/2003 | Nishiyama et al. |
| 2003/0169681 | A1 | 9/2003 | Li et al. |
| 2003/0189893 | A1 | 10/2003 | Richardson |
| 2003/0203721 | A1 | 10/2003 | Berezdivin et al. |
| 2003/0224731 | A1 | 12/2003 | Yamaura et al. |
| 2003/0224797 | A1 | 12/2003 | Kuan |
| 2004/0042534 | A1 | 3/2004 | Raphaeli et al. |
| 2004/0047368 | A1 | 3/2004 | Xu |
| 2004/0141522 | A1 | 7/2004 | Texerman et al. |
| 2004/0153767 | A1 | 8/2004 | Dolgonos |
| 2004/0179557 | A1 | 9/2004 | Tong et al. |
| 2004/0224691 | A1 | 11/2004 | Hadad |
| 2004/0233936 | A1 | 11/2004 | Cheng |
| 2005/0085214 | A1 | 4/2005 | Laroia et al. |
| 2005/0100039 | A1 | 5/2005 | Husted et al. |
| 2005/0180314 | A1 | 8/2005 | Webster et al. |
| 2005/0201476 | A1 | 9/2005 | Kim et al. |
| 2006/0114812 | A1 | 6/2006 | Kim et al. |
| 2007/0008917 | A1 | 1/2007 | Calcagno et al. |

FOREIGN PATENT DOCUMENTS

| | | |
|---|---|---|
| EP | 1267513 | 12/2002 |
| EP | 1267540 | 12/2002 |
| FR | 2844408 A1 | 3/2004 |
| JP | H11-317905 A | 11/1999 |
| JP | 2001-274767 | 10/2001 |
| WO | 2003/071728 | 8/2003 |
| WO | 2003/088539 | 10/2003 |
| WO | 2005/109705 | 4/2005 |
| WO | 2005/074305 | 8/2005 |
| WO | 2005/078976 | 8/2005 |
| WO | 2005/081439 | 9/2005 |
| WO | 2005/088853 | 9/2005 |

OTHER PUBLICATIONS

Andrews et al., Fundamentals of WiMAX; Understanding Broadband Wireless Networking, Prentice Hall, pp. 73 and 248 (2007).
ANSI, American National Standard for photography—photographic exposure guide, ANSI PH2.Jul. 1986 (1986).
AT&T et al., "IEEE 802.11 QoS MAC Enhancements," IEEE 802.11-00/071 (May 2000).
Chang, "Synthesis of band-limited orthogonal signals for multichannel data transmission," Bell System Technical Journal 45 (10):1775-1796 (Dec. 1966).

(56) References Cited

OTHER PUBLICATIONS

Chuang et al., "Beyond 3G: Wideband Wireless Data Access Based on OFDM and Dynamic Packet Assignment," IEEE Communications Magazine, pp. 78-87 (Jul. 2000).
Cimini, "Analysis and Simulation of a Digital Mobile Channel Using Orthogonal Frequency Division Multiplexing," IEEE Transactions on Communications, vol. Com-33, No. 7, pp. 665-675 (Jul. 1985).
Duan et al., "Fast Tone Mapping for High Dynamic Range Images," Proceedings of the 17th International Conference on Pattern Recognition, IEEE Computer Society (2004).
E2V Technologies, CCD Sensors Technical Note Glossary of Terms (Jun. 2003).
*Ericsson Inc. et al. v. Intellectual Ventures II LLC*, Decision Denying Request for Rehearing, U.S. Pat. No. 7,787,431, IPR 2015-01664 (Apr. 28, 2017).
*Ericsson Inc. et al. v. Intellectual Ventures II LLC*, Decision Institution of Inter Partes Review, U.S. Pat. No. 7,787,431, IPR 2015-01664 (Feb. 11, 2016).
*Ericsson Inc. et al. v. Intellectual Ventures II LLC*, Decision Institution of Inter Partes Review, U.S. Pat. No. 7,787,431, IPR 2014-01195 (Feb. 4, 2015).
*Ericsson Inc. et al. v. Intellectual Ventures II LLC*, Decision on Request for Rehearing, U.S. Pat. No. 7,787,431, IPR 2014-01195 (Mar. 26, 2015).
*Ericsson Inc. et al. v. Intellectual Ventures II LLC*, Declaration of Zygmunt J. Haas, Ph.D. under 37 C.F.R. § 1.68, Petition for Inter Partes Review, U.S. Pat. No. 7,787,431, IPR 2015-01664 (Jul. 30, 2015).
*Ericsson Inc. et al. v. Intellectual Ventures II LLC*, Declaration of Kenneth Zeger, Ph.D., U.S. Pat. No. 7,787,431, IPR 2015-01664 (May 9, 2016).
*Ericsson Inc. et al. v. Intellectual Ventures II LLC*, Declaration of Zygmunt J. Haas, Ph.D. under 37 C.F.R. § 1.68, U.S. Pat. No. 7,787,431, IPR 2014-01195 (Jul. 21, 2014).
*Ericsson Inc. et al. v. Intellectual Ventures II LLC*, Declaration of Kenneth Zeger, Ph.D., U.S. Pat. No. 7,787,431, IPR 2014-01195 (Apr. 23, 2015).
*Ericsson Inc. et al. v. Intellectual Ventures II LLC*, Final Written Decision, U.S. Pat. No. 7,787,431, IPR 2015-01664 (Feb. 8, 2017).
*Ericsson Inc. et al. v. Intellectual Ventures II LLC*, Final Written Decision, U.S. Pat. No. 7,787,431, IPR 2014-01195 (Jan. 29, 2016).
*Ericsson Inc. et al. v. Intellectual Ventures II LLC*, Intellectual Ventures II LLC's Demonstratives for Oral Argument, U.S. Pat. No. 7,787,431, IPR 2015-01664 (Oct. 3, 2016).
*Ericsson Inc. et al. v. Intellectual Ventures II LLC*, Patent Owner Preliminary Response, Case IPR 2018-01689, U.S. Pat. No. 8,953,641 (Jan. 22, 2019).
*Ericsson Inc. et al. v. Intellectual Ventures II LLC*, Patent Owner Preliminary Response, U.S. Pat. No. 7,787,431, IPR 2015-01664 (Nov. 18, 2015).
*Ericsson Inc. et al. v. Intellectual Ventures II LLC*, Patent Owner Response, U.S. Pat. No. 7,787,431, IPR 2015-01664 (May 9, 2016).
*Ericsson Inc. et al. v. Intellectual Ventures II LLC*, Patent Owner Preliminary Response, U.S. Pat. No. 7,787,431, IPR 2014-01195 (Nov. 5, 2014).
*Ericsson Inc. et al. v. Intellectual Ventures II LLC*, Patent Owner's Opposition to Request for Rehearing, U.S. Pat. No. 7,787,431, IPR 2014-01195 (Mar. 11, 2015).
*Ericsson Inc. et al. v. Intellectual Ventures II LLC*, Patent Owner Response, U.S. Pat. No. 7,787,431, IPR 2014-01195 (Apr. 23, 2015).
*Ericsson Inc. et al. v. Intellectual Ventures II LLC*, Patent Owner's Objections to Evidence Submitted with Reply Brief, U.S. Pat. No. 7,787,431, IPR 2014-01195 (Jul. 21, 2015).
*Ericsson Inc. et al. v. Intellectual Ventures II LLC*, Patent Owner's Demonstratives for Oral Argument, U.S. Pat. No. 7,787,431, IPR 2014-01195 (Sep. 4, 2015).
*Ericsson Inc. et al. v. Intellectual Ventures II LLC*, Petition for Inter Partes Review, U.S. Pat. No. 7,787,431, IPR 2015-01664 (Aug. 3, 2015).
*Ericsson Inc. et al. v. Intellectual Ventures II LLC*, Petition for Inter Partes Review, U.S. Pat. No. 7,787,431, IPR 2014-01195 (Jul. 22, 2014).
*Ericsson Inc. et al. v. Intellectual Ventures II LLC*, Petitioner Ericsson Inc. and Telefonaktiebolaget LM Ericsson's Reply to Patent Owner's Response, U.S. Pat. No. 7,787,431, IPR 2015-01664 (Jul. 25, 2015).
*Ericsson Inc. et al. v. Intellectual Ventures II LLC*, Petitioner Ericsson Inc. and Telefonaktiebolaget LM Ericsson's Demonstratives for Oral Argument, U.S. Pat. No. 7,787,431, IPR 2015-01664 (Oct. 6, 2016).
*Ericsson Inc. et al. v. Intellectual Ventures II LLC*, Petitioner Ericsson Inc. and Telefonaktiebolaget LM Ericsson's Reply to Patent Owner's Response, U.S. Pat. No. 7,787,431, IPR 2014-01195 (Jul. 14, 2015).
*Ericsson Inc. et al. v. Intellectual Ventures II LLC*, Petitioner Ericsson Inc. and Telefonaktiebolaget LM Ericsson's Demonstratives for Oral Argument, U.S. Pat. No. 7,787,431, IPR 2014-01195 (Sep. 4, 2015).
*Ericsson Inc. et al. v. Intellectual Ventures II LLC*, Petitioner's Request for Rehearing, U.S. Pat. No. 7,787,431, IPR 2015-01664 (Mar. 10, 2017).
*Ericsson Inc. et al. v. Intellectual Ventures II LLC*, Petitioner's Request for Rehearing Pursuant to 37 C.F.R. §§ 42.71(c) and (d), U.S. Pat. No. 7,787,431, IPR 2014-01195 (Feb. 18, 2015).
*Ericsson Inc. et al. v. Intellectual Ventures II LLC*, Reply to Patent Owner Preliminary Response, Case IPR 2018-01689, U.S. Pat. No. 8,953,641 (Feb. 14, 2019).
*Ericsson Inc. et al. v. Intellectual Ventures II LLC*, Supplemental Declaration of Zygmunt J. Haas, Ph.D. under 37 C.F.R. § 1.68 on behalf of Petitioner, U.S. Pat. No. 7,787,431, IPR 2015-01664 (Jul. 25, 2016).
*Ericsson Inc. et al. v. Intellectual Ventures II LLC*, Supplemental Declaration of Zygmunt J. Haas, Ph.D., U.S. Pat. No. 7,787,431, IPR 2014-01195 (Jul. 14, 2015).
*Ericsson Inc. et al. v. Intellectual Ventures II LLC*, Surreply in Support of Patent Owner Preliminary Response, Case IPR 2018-01689, U.S. Pat. No. 8,953,641 (Feb. 27, 2019).
Final Rejection, U.S. Appl. No. 17/396,972, dated Dec. 16, 2022.
Holma et al., WCDMA for UMTS, Third Edition, Wiley & Sons (2001).
Ibiquity Digital Corporation, IBOC AM Transmission Specification (Nov. 2001).
IEEE Standard Dictionary of Electrical and Electronics Terms, 6th edition, p. 156-158 (1996).
*Intellectual Ventures I LLC et al. v. Toyota Motor Corp et al.*, Complaint for Patent Infringement, U.S. District Court for the Eastern District of Texas, Marshall Division, C.A. No. 2:21-cv-389 (Oct. 19, 2021).
*Intellectual Ventures I LLC et al. v. Toyota Motor Corp et al.*, Defendants' Answer to Plaintiff's Complaint, U.S. District Court for the Eastern District of Texas, Marshall Division, C.A. No. 2:21-cv-389 (Jan. 31, 2022).
*Intellectual Ventures I LLC et al., v. General Motors Company et al.*, Complaint for Patent Infringement, U.S. District Court for the Western District of Texas, Waco Division, C.A. No. 6:21-CV-01088 (Oct. 19, 2021).
*Intellectual Ventures I LLC et al., v. General Motors Company et al.*, Defendants General Motors Company and General Motors LLC's Answer, Affirmative Defenses, and Counterclaims to Plaintiffs' Complaint for Patent Infringement, U.S. District Court for the Western District of Texas, Waco Division, C.A. No. 6:21-CV-01088 (Jan. 7, 2022).
*Intellectual Ventures I LLC et al., v. General Motors Company et al.*, Defendants General Motors Company and General Motors LLC's Amended Answer, Affirmative Defenses, and Counterclaims to Plaintiffs' Complaint for Patent Infringement, U.S. District Court for the Western District of Texas, Waco Division, C.A. No. 6:21-CV-01088 (Jan. 27, 2022).

(56) References Cited

OTHER PUBLICATIONS

*Intellectual Ventures I LLC et al.*, v. *General Motors Company et al.*, Answer to Amended Counterclaims, U.S. District Court for the Western District of Texas, Waco Division, C.A. No. 6:21-CV-01088 (Feb. 10, 2022).
*Intellectual Ventures I LLC et al.*, v. *General Motors Company et al.*, Defendants' Opening Claim Construction Brief, U.S. District Court for the Western District of Texas, Waco Division, C.A. No. 6:21-CV-01088 (Jun. 17, 2022).
Non-Final Rejection, U.S. Appl. No. 17/396,972, dated Aug. 18, 2022.
"A New Frame Structure for Scalable OFDMA Systems," IEEE 802.16 Broadband Wireless Access Working Group, dated Mar. 11, 2004, 13 pages.
"Call for Contributions on Project 802.16e: Mobility Enhancements to IEEE Standard 802.16/802.16a," IEEE 802.16e-02/01, dated Dec. 19, 2002, 1 page.
"OFDM for Wireless Multimedia Communications," Richard Van Nee and Ramjee Prasad, 2000, 24 pages.
Part 11: Wireless LAN Medium Access Control (MAC) and Physical Layer (PHY) Specifications, ANSI/IEEE Std 802.11, 1999 Edition, 528 pages.
"Part 16: Air Interface for Fixed Broadband Wireless Access Systems—Amendment 2: Medium Access Control Modifications and Additional Physical Layer Specifications for 2-11 GHz," IEEE Std. 802.16a, dated Apr. 1, 2003, 318 pages.
"Spreading Sequences for Uplink and Downlink MC-CDMA Systems: PAPR and MAI Minimization," European Transactions on Communications, vol. 13, No. 5, pp. 465-474 (2002), 10 pages.
"Universal Mobile Telecommunications Systems {UMTS}," UMTS 30.06 version 3.0.0, Technical Report, dated Feb. 1997, 689 pages.
"Wireless Communications Principles and Practice," Theodore S. Rappaport, 1996, 108 pages.
AFC Decision, Case 16-1803, dated Apr. 18, 2017 (20 pages).
Branlund et al, "AAS Enhancements for 1x Scalable PHY", IEEE Publication dated Mar. 15, 2004, 16 pages.
Defendant's Initial Invalidity Contentions, dated May 4, 2015, (195 pages).
*Ericsson Inc. et al.* v. *Intellectual Ventures II LLC*, Decision Instituting Inter Partes Review, dated Apr. 16, 2019, 63 pages.
*Ericsson Inc. et al.* v. *Intellectual Ventures II LLC*, Final Decision dated Jan. 29, 2016, 28 pages.
*Ericsson Inc. et al.* v. *Intellectual Ventures II LLC*, U.S. Pat. No. 7,787,431, Final Written Decision, 35 USC §318{a) and 37 CFR §42.73, dated Feb. 8, 2017, 18 pages.
*Ericsson Inc. et al.* v. *Intellectual Ventures II LLC*, U.S. Pat. No. 8,953,641, Declaration of Dr. Vijay K. Madisetti, Ph.d. Under 37 CFR §1.68 in Support of Petition for Inter Partes Review, dated Sep. 4, 2018, 15 pages.
*Ericsson Inc. et al.* v. *Intellectual Ventures II LLC*, U.S. Pat. No. 8,953,641, Petition for Inter Partes Review under 35 USC §312 and 37 CFR §42.104, date of service Sep. 7, 2018, 84 pages.
*Ericsson Inc. et al.* v. *Intellectual Ventures II LLC*, U.S. Pat. No. 8,953,641, Notice of Filing Date Accorded to Petition and Time for Filing Patent Owner Preliminary Response, mailed Oct. 19, 2018, 6 pages.
Expert Declaration of Andrew C. Singer, Ph. D., for Inter Partes Review of U.S. Pat. No. 8,953,641, dated Sep. 19, 2018, 134 pages.
Extended European Search Report for EP 17157186, dated Jun. 21, 2017. (12 pages).
Final Rejection, U.S. Appl. No. 15/727,831, dated Aug. 10, 2018.
Final Rejection, U.S. Appl. No. 16/715,995, dated Sep. 17, 2020.
International Preliminary Report on Patentability, issued in International Application No. PCT/US2005/014828, mailed Jan. 1, 2006, 5 pages.
International Search Report and Written Opinion, issued in International Application No. PCT/US2005/014828, mailed Feb. 27, 2005, 5 pages.
Invalidity Appendix L, Li '431 Patent, dated May 4, 2015, 93 pages.
Invalidity Exhibit L1, Branlund, dated May 4, 2015,33 pages.
Invalidity Exhibit L2, Liebetreu, dated May 4, 2015, 29 pages.
Invalidity Exhibit L3, UTRA Technical Report, dated May 4, 2015,37 pages.
Invalidity Exhibit L4, Li '283 Patent, dated May 4, 2015, 14 pages.
Invalidity Exhibit L5, Ma, dated May 4, 2015, 22 pages.
Invalidity Exhibit L6, McFarland, dated May 4, 2015, 37 pages.
Leibetreu et al., "AAS Enhancements for OFDMA PHY", IEEE Publication dated Mar. 18, 2004, 18 pages.
Merriam-Webster Collegiate Dictionary, Tenth Edition, 1993, 4 pages.
Non-Final Rejection, U.S. Appl. No. 15/727,831, dated Jan. 18, 2018.
Non-Final Rejection, U.S. Appl. No. 15/727,831, dated Jan. 9, 2019.
Non-Final Rejection, U.S. Appl. No. 16/715,995, dated Feb. 21, 2020.
Notice of Allowance, issued in U.S. Appl. No. 10/583,534, mailed Apr. 30, 2010, 8 pages.
Notice of Allowance, U.S. Appl. No. 15/727,831, dated Jul. 29, 2019.
Notice of Allowance, U.S. Appl. No. 16/715,995, dated Mar. 3, 2021.
Office Action for Chinese Patent Application No. 200580012992.9; mailed Jan. 29, 2010, 4 pages.
Office Action, issued in U.S. Appl. No. 10/583,534, mailed Apr. 28, 2009, 21 pages.
Office Action, issued in U.S. Appl. No. 10/583,534, mailed Jan. 7, 2010, 20 pages.
PTAB Final Written Decision, Cases IPR2014-01195, dated Jan. 29, 2016 (28 pages).
PTAB Final Written Decision, Cases IPR2015-01664, dated Feb. 8, 2017. (18 pages).
*Sprint Spectrum L.P. et al.*, v. *Intellectual Ventures II LLC*, Decision Instituting Inter Partes Review, dated Apr. 12, 2019, 66 pages.
*Sprint Spectrum L.P. et al.*, v. *Intellectual Ventures II LLC*, Expert Declaration of Randall C. Schwartz for Inter Partes Review of U.S. Pat. No. 8,953,641, dated Sep. 17, 2018, 68 pages.
*Sprint Spectrum L.P. et al.*, v. *Intellectual Ventures II LLC*, U.S. Pat. No. 8,953,641, Notice of Filing Date Accorded to Petition and Time for Filing Patent Owner Preliminary Response, dated Oct. 17, 2018, 7 pages.
*Sprint Spectrum L.P. et al.*, v. *Intellectual Ventures II LLC*, Petition for Inter Partes Review of U.S. Pat. No. 8,953,641 Under 35 USC §§311-319 and 37 CFR §42.100, Certificate of Service dated Sep. 21, 2018, 76 pages.
Yaghoobi, "Scalable OFDMA Physical Layer in IEEE 802.16 WirelessMAN," Intel Technology Journal, 004-08-20, vol. 8, Issue 3, pp. 201-212.
Yi et al., "Orthogonal multicarrier bandwidth modulation scheme for wireless communications," The 13th IEEE International Symposium on Personal Indoor and Mobile Radio Communications, Sep. 2002, vol. 5, pp. 2054-2058.
Non-Final Rejection, U.S. Appl. No. 17/396,972, dated Dec. 20, 2021.
Jurgen, Automotive Electronics Handbook, McGraw-Hill, Inc. (1995).
Kerr et al., "Additional Preamble Definitions for 802.16d OFDM-256," IEEE C802.16d-04/36r2 (Mar. 17, 2004).
Koffman et al., "Broadband Wireless Access Solutions Based on OFDM Access in IEEE 802.16," IEEE Communications Magazine, pp. 96-103 (Apr. 2002).
Kurpis, IEEE Standard Dictionary of Electrical and Electronics Terms, p. 688 (1993).
Liebetreu et al., "AAS Enhancements for OFDMA PHY", IEEE C802.16-04/51r1 (Mar. 15, 2004).
Liebetreu et al., "OFDMA PHY Enhancements for better mobility performance," IEEE C802.16d-04/50r1 (Mar. 15, 2004).
Markarian et al., "OFDM proposal for the IEEE 802.16a PHY draft standard," IEEE 802.16.3c-01/33r2 (Mar. 9, 2001).
Marks, "IEEE Standard 802.16: A Technical Overview of the WirelessMAN Air Interface for Broadband Wireless Access," IEEE C802.16-02/05 (Jun. 4, 2002).
McDaniel, IBM Dictionary of Computing, McGraw-Hill, Inc., p. 104 (1994).

(56) References Cited

OTHER PUBLICATIONS

McGraw-Hill Dictionary of Scientific and Technical Terms, 6th edition, pp. 149, 448, 2153 (2003).
Pahlavan, Principles of Wireless Networks, Prentice Hall PTR, Chapter 7, pp. 320-347 (2002).
Popovic, "Spreading Sequences for Multicarrier CDMA Systems," IEEE Transactions on Communications, vol. 47, No. 6 (Jun. 1999).
Segal et al., "Applying Scalability for the OFDMA PHY Layer," IEEE 802.16e-04/47r2 (Mar. 30, 2004).
Smith et al., 3G Wireless Networks, McGraw-Hill Telecom Professional (2002).
*Sprint Spectrum L.P. et al. v. Intellectual Ventures II LLC*, Patent Owner Preliminary Response, Case IPR 2018-01770, U.S. Pat. No. 8,953,641 (Jan. 17, 2019).
*Sprint Spectrum L.P. et al. v. Intellectual Ventures II LLC*, Petitioner's Reply to Patent Owner Preliminary Response, Case IPR 2018-01770, U.S. Pat. No. 8,953,641 (Feb. 14, 2019).
*Sprint Spectrum L.P. et al. v. Intellectual Ventures II LLC*, Surreply in Support of Patent Owner Preliminary Response, Case IPR 2018-01770, U.S. Pat. No. 8,953,641 (Feb. 27, 2019).
Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications; High-speed Physical Layer in the 5 GHz Band, IEEE Std. 802.11a-1999 (1999).
Tanenbaum, Computer Networks, Third Edition, Prentice Hall International, Inc. (1996).
Timings et al., The Pocket Illustrated Dictionary of Engineering Terms, p. 174 (2001).
Tomsic, Dictionary of Materials and Testing, 2nd Edition, p. 229 (2000).
*Toyota Motor Corp et al. v. Intellectual Ventures II LLC*, Decision Granting Institution of Inter Partes Review, U.S. Pat. No. 8,953,641, Case No. IPR 2022-00974 (Dec. 7, 2022).
*Toyota Motor Corp et al. v. Intellectual Ventures II LLC*, Declaration of Dr. Robert Akl, D.Sc., U.S. Pat. No. 8,953,641, Case No. IPR 2022-00974 (May 10, 2022).
*Toyota Motor Corp et al. v. Intellectual Ventures II LLC*, Declaration of Dr. Gary Lomp in Support of Patent Owner's Preliminary Response, U.S. Pat. No. 8,953,641, Case No. IPR 2022-00974 (Sep. 8, 2022).
*Toyota Motor Corp et al. v. Intellectual Ventures II LLC*, Patent Owner's Preliminary Response, U.S. Pat. No. 8,953,641, Case No. IPR 2022-00974 (Sep. 9, 2022).
*Toyota Motor Corp et al. v. Intellectual Ventures II LLC*, Petition for Inter Partes Review of U.S. Pat. No. 8,953,641, Case No. IPR 2022-00974 (May 10, 2022).
Universal Mobile Telecommunications System (UMTS); UMTS Terrestrial Radio Access (UTRA); Concept evaluation (UMTS 30.06 version 3.0.0), ETSI TR 101 146 V3.0.0 (Dec. 1997).
Van De Beek et al., "A Time and Frequency Synchronization Scheme for Multiuser OFDM," IEEE Journal on Selected Areas in Communications, No. 17, No. 11 (Nov. 1999).
Van Nee et al., OFDM for Wireless Multimedia Communications, Artech House, pp. 97 and 105 (2000).
Van Waes, "OFDM based 802.16.3 PHY Proposal," IEEE 802.16.3c-01/10r2 (Jan. 24, 2001).
Vaughan-Nichols, "OFDM: Back to the Wireless Future," Industry Trends, pp. 19-21 (Dec. 2002).
Ward, "802.16.3 2G OFDM System for Broadband Wireless Access Development, Session #11 Presentation," IEEE 802.16.3c-01/07 (Jan. 18, 2001).
Webster's American Dictionary, Random House, Inc. (1997).
Won-Ho et al., "Extending Dynamic Range of Two Color Images under Different Exposures," Proceedings of the 17th International Conference on Pattern Recognition, IEEE Computer Society (2004).
Yang, "3G CDMA2000 Wireless System Engineering," Artech House, Inc. pp. 11-32, 97-121, 196-198 (2004).
Zhang et al., "An Efficient Multiuser Frequency-Time Grid (FTG) Allocation Algorithm for OFDM-based Broadband Wireless Systems," IEEE 15th International Symposium on Personal, Indoor and Mobile Radio Communications, vol. 3, pp. 2092-2097 (2004).
Zhang et al., "Multiuser OFDM with Adaptive Frequency-Time Two-Dimensional Wireless Resource Allocation," IEEE Joint Conference of the 10th Asia-Pacific Conference on Communications and the 5th International Symposium on Multi-Dimensional Mobile Communications Proceeding, vol. 2, pp. 824-829 (2004).
*American Honda Motor Co., Inc. v. Intellectual Ventures II LLC*, Declaration of Stephen B. Wicker, U.S. Pat. No. 8,953,641, IPR 2023-00032 (Oct. 11, 2022).
*American Honda Motor Co., Inc. v. Intellectual Ventures II LLC*, Petition for Inter Partes Review of U.S. Pat. No. 8,953,641, IPR 2023-00032 (Oct. 11, 2022).
*American Honda Motor Co., Inc. v. Intellectual Ventures II LLC*, Patent Owner's Preliminary Response, U.S. Pat. No. 8,953,641, IPR 2023-00032 (Jan. 18, 2023).
Chang et al., Minutes of IEEE 802.16 Session #30, IEEE 802.16-04/16, (May 14, 2004).
IEEE 802.16 Working Group on Broadband Wireless Access (BWA), IEEE 802.16-04/13 (Mar. 15, 2004).
IEEE Standard for Local and metropolitan area networks; Part 16: Air Interface for Fixed and Mobile Broadband Wireless Access Systems, IEEE Std 802.16-2004 (Oct. 2004).
IEEE Standard for Local and metropolitan area networks; Part 16: Air Interface for Fixed and Mobile Broadband Wireless Access Systems, Figure 218—IEEE Std 802.16-2004 (Oct. 2004).
Khan, Introduction to 3G/4G Wireless Network Architecture, 2001 IEEE International Symposium on Circuits and Systems (May 2001).
Larsson et al., "Preamble Design for Multiple-Antenna OFDM-Based WLANs with Null Subcarriers," IEEE Signal Processing Letters, vol. 8, No. 11 (Nov. 2001).
Suh et al., Channel Estimation Technique for Mitigating ICI in MIMO-OFDM Cellular Systems, IEEE Communications Society (2004).
Suh et al., Comparative Study of Time-Domain and Frequency-Domain Channel Estimation in MIMO-OFDM Systems, 14th IEEE 2003 International Symposium on Personal, Indoor, and Mobile Radio Communications Proceedings (2003).
*Toyota Motor Corp et al. v. Intellectual Ventures II LLC*, Declaration of Dr. Gary Lomp in Support of Patent Owner's Response, U.S. Pat. No. 8,953,641, IPR 2022-00974 (Apr. 5, 2023).
*Toyota Motor Corp et al. v. Intellectual Ventures II LLC*, Oral Deposition of Dr. Robert Akl, D.Sc., U.S. Pat. No. 8,953,641, IPR 2022-00974 (Feb. 17, 2023).
*Toyota Motor Corp et al. v. Intellectual Ventures II LLC*, Patent Owner's Response, U.S. Pat. No. 8,953,641, IPR 2022-00974 (Apr. 7, 2023).
*Toyota Motor Corp et al. v. Intellectual Ventures II LLC*, Remote Deposition of Randall Schwartz, U.S. Pat. No. 8,953,641, IPR 2022-00974 (Feb. 21, 2023).
*Intellectual Ventures I LLC et al., v. General Motors Company et al.*, Declaration of Christopher Hansen, Ph.D. in Support of Defendants' Opening Claim Construction Brief, U.S. District Court for the Western District of Texas, Waco Division, C.A. No. 6:21-CV-01088 (Jun. 17, 2022).
*Intellectual Ventures I LLC et al., v. General Motors Company et al.*, Declaration of Paul S. Min, Ph.D. in Support of Defendants' Opening Claim Construction Brief, U.S. District Court for the Western District of Texas, Waco Division, C.A. No. 6:21-CV-01088 (Jun. 17, 2022).
*Intellectual Ventures I LLC et al., v. General Motors Company et al.*, Declarations of Edwin A. Hernandez-Mondragon, Ph.D., U.S. District Court for the Western District of Texas, Waco Division, C.A. No. 6:21-CV-01088 (Aug. 1, 2022).
*Intellectual Ventures I LLC et al., v. General Motors Company et al.*, Declarations of Tim A. Williams, Ph.D., U.S. District Court for the Western District of Texas, Waco Division, C.A. No. 6:21-CV-01088 (Aug. 1, 2022).
*Intellectual Ventures I LLC et al., v. General Motors Company et al.*, Plaintiffs Intellectual Ventures I LLC and Intellectual Ventures II

(56) References Cited

OTHER PUBLICATIONS

LLC's Responsive Claim Construction Brief, U.S. District Court for the Western District of Texas, Waco Division, C.A. No. 6:21-CV-01088 (Aug. 1, 2022).
*Intellectual Ventures I LLC et al.*, v. *General Motors Company et al.*, Defendants' Preliminary Invalidity Contentions, U.S. District Court for the Western District of Texas, Waco Division, C.A. No. 6:21-CV-01088 (Apr. 30, 2022).
*Intellectual Ventures I LLC et al.*, v. *General Motors Company et al.*, Defendants' First Supplemental Preliminary Invalidity Contentions, U.S. District Court for the Western District of Texas, Waco Division, C.A. No. 6:21-CV-01088 (May 4, 2022).
*Intellectual Ventures I LLC et al.*, v. *General Motors Company et al.*, Defendants' Preliminary Proposed Constructions of Claim Terms and Phrases, U.S. District Court for the Western District of Texas, Waco Division, C.A. No. 6:21-CV-01088 (May 13, 2022).
*Intellectual Ventures I LLC et al.*, v. *General Motors Company et al.*, Defendants' Reply Claim Construction Brief, U.S. District Court for the Western District of Texas, Waco Division, C.A. No. 6:21-CV-01088 (Sep. 2, 2022).
*Intellectual Ventures I LLC et al.*, v. *General Motors Company et al.*, Defendants' General Motors Company and General Motors LLC's Second Amended Answer, Affirmative Defenses, and Counterclaims to Plaintiffs' Complaint for Patent Infringement, U.S. District Court for the Western District of Texas, Waco Division, C.A. No. 6:21-CV-01088 (Mar. 6, 2023).
*Intellectual Ventures I LLC et al.*, v. *General Motors Company et al.*, Claim Construction Order, U.S. District Court for the Western District of Texas, Waco Division, C.A. No. 6:21-CV-01088 (Dec. 1, 2022).
*Intellectual Ventures I LLC et al.*, v. *General Motors Company et al.*, Memorandum in Support of Claim Construction Order, U.S. District Court for the Western District of Texas, Waco Division, C.A. No. 6:21-CV-01088 (Dec. 1, 2022).
*Intellectual Ventures I LLC et al.*, v. *General Motors Company et al.*, Joint Claim Construction Statement, U.S. District Court for the Western District of Texas, Waco Division, C.A. No. 6:21-CV-01088 (Oct. 21, 2022).
*Intellectual Ventures I LLC et al.*, v. *General Motors Company et al.*, Plaintiffs Intellectual Ventures LLC and Intellectual Ventures II LLC's Sur-Reply Claim Construction Brief, U.S. District Court for the Western District of Texas, Waco Division, C.A. No. 6:21-CV-01088 (Sep. 23, 2022).
*Intellectual Ventures I LLC et al.*, v. *Honda Motor Company, Ltd. et al.*, Complaint for Patent Infringement, U.S. District Court for the Northern District of Texas, Dallas Division, C.A. No. 3:22-cv-761 (Apr. 4, 2022).
*Intellectual Ventures I LLC et al.*, v. *Honda Motor Company, Ltd. et al.*, Defendants' Answer and Counterclaims to Plaintiffs' Complaint, U.S. District Court for the Northern District of Texas, Dallas Division, C.A. No. 3:22-cv-761 (Jun. 17, 2022).
*Intellectual Ventures I LLC et al.*, v. *Honda Motor Company, Ltd. et al.*, Answer to Defendants' Counterclaims, U.S. District Court for the Northern District of Texas, Dallas Division, C.A. No. 3:22-cv-761 (Jul. 8, 2022).
*Intellectual Ventures II LLC* v. *Sprint Spectrum L.P. et al.*, Complaint, U.S. District Court for the Eastern District of Texas, Marshall Division, No. 2:17-cv-661 (Sep. 21, 2017).
*Intellectual Ventures II LLC* v. *Sprint Spectrum L.P. et al., and T-Mobile USA Inc. et al., and Nokia of America Corporation*, Motion for Partial Summary Judgment that Certain Disputed References are Prior Art, Civil Case No. 2:17-cv-662-JRG and Civil Case No. 2:17-cv-661-JRG, U.S. District Court for the Eastern District of Texas, Marshall Division (Feb. 25, 2019).
*Intellectual Ventures II LLC* v. *Sprint Spectrum L.P. et al., and T-Mobile USA Inc. et al., and Nokia of America Corporation*, Plaintiff Intellectual Ventures II LLC's Opposition to Defendants' Motion for Partial Summary Judgment that Certain Disputed References are Prior Art, Civil Case No. 2:17-cv-662-JRG and Civil Case No. 2:17-cv-661-JRG, U.S. District Court for the Eastern District of Texas, Marshall Division (Mar. 18, 2019).
*Intellectual Ventures II LLC* v. *Sprint Spectrum L.P. et al., and T-Mobile USA Inc. et al., and Nokia of America Corporation*, Reply in Support of Defendants' Prior Art Summary Judgment Motion, Civil Case No. 2:17-cv-662-JRG and Civil Case No. 2:17-cv-661-JRG, U.S. District Court for the Eastern District of Texas, Marshall Division (Mar. 26, 2019).
*Intellectual Ventures II LLC* v. *Sprint Spectrum L.P. et al., and T-Mobile USA Inc. et al., and Nokia of America Corporation*, Defendants' Motion for Summary Judgment of No Willful Infringement, Civil Case No. 2:17-cv-661-JRG, U.S. District Court for the Eastern District of Texas, Marshall Division (Feb. 27, 2019).
*Intellectual Ventures II LLC* v. *Sprint Spectrum L.P. et al., and T-Mobile USA Inc. et al., and Nokia of America Corporation*, T-Mobile USA, Inc., and T-Mobile US, Inc.'s Answer and Counterclaims to IV's Complaint, Civil Case No. 2:17-cv-662-JRG and Civil Case No. 2:17-cv-661-JRG, U.S. District Court for the Eastern District of Texas, Marshall Division (Oct. 15, 2018).
*Intellectual Ventures II LLC* v. *Sprint Spectrum L.P. et al., and T-Mobile USA Inc. et al., and Nokia of America Corporation*, Plaintiff Intellectual Ventures II LLC's Opening Claim Construction Brief, Civil Case No. 2:17-cv-662-JRG and Civil Case No. 2:17-cv-661-JRG, U.S. District Court for the Eastern District of Texas, Marshall Division (Sep. 14, 2018).
*Intellectual Ventures II LLC* v. *Sprint Spectrum L.P. et al., and T-Mobile USA Inc. et al., and Nokia of America Corporation*, T-Mobile USA, Inc. and T-Mobile US, Inc.'s First Set of Individual Interrogatories (Nos. 1-5), Civil Case No. 2:17-cv-662-JRG and Civil Case No. 2:17-cv-661-JRG, U.S. District Court for the Eastern District of Texas, Marshall Division (Feb. 27, 2019).
*Intellectual Ventures II LLC* v. *Sprint Spectrum L.P. et al., and T-Mobile USA Inc. et al., and Nokia of America Corporation*, Plaintiff Intellectual Ventures II LLC's Corrected and Supplemental Responses and Objections to Defendants' First Set of Common Interrogatories (No. 1-14), Civil Case No. 2:17-cv-662-JRG and Civil Case No. 2:17-cv-661-JRG, U.S. District Court for the Eastern District of Texas, Marshall Division (Jul. 18, 2018).
*Intellectual Ventures II LLC* v. *Sprint Spectrum L.P. et al., and T-Mobile USA Inc. et al., and Nokia of America Corporation*, Plaintiff Intellectual Ventures II LLC's Responses and Objections to Defendants' First Set of Common Interrogatories (No. 1-14), Civil Case No. 2:17-cv-662-JRG and Civil Case No. 2:17-cv-661-JRG, U.S. District Court for the Eastern District of Texas, Marshall Division (Apr. 13, 2018).
*Intellectual Ventures II LLC* v. *Sprint Spectrum L.P. et al., and T-Mobile USA Inc. et al.*, Defendants' First Set of Common Interrogatories to Plaintiff Intellectual Ventures II (No. 1-14), Civil Case No. 2:17-cv-662-JRG and Civil Case No. 2:17-cv-661-JRG, U.S. District Court for the Eastern District of Texas, Marshall Division (Feb. 27, 2019).
*Intellectual Ventures II LLC* v. *Sprint Spectrum L.P. et al., and T-Mobile USA Inc. et al.*, P.R. 4-5 Joint Claim Construction Chart, Civil Case No. 2:17-cv-662-JRG and Civil Case No. 2:17-cv-661-JRG, U.S. District Court for the Eastern District of Texas, Marshall Division (Oct. 17, 2018).
*Intellectual Ventures II LLC* v. *Sprint Spectrum L.P et al., and T-Mobile USA Inc. et al., and Nokia of America Corporation*, Defendants' Responsive Claim Construction Brief, Civil Case No. 2:17-cv-662-JRG and Civil Case No. 2:17-cv-661-JRG, U.S. District Court for the Eastern District of Texas, Marshall Division (Oct. 3, 2018).
*Intellectual Ventures II LLC* v. *Sprint Spectrum L.P. et al., and T-Mobile USA Inc. et al., and Nokia of America Corporation*, Plaintiff Intellectual Ventures II LLC's Responses and Objections to Defendants' Second Set of Common Interrogatories (Nos. 15-17), Civil Case No. 2:17-cv-662-JRG and Civil Case No. 2:17-cv-661-JRG, U.S. District Court for the Eastern District of Texas, Marshall Division (Jun. 27, 2018).
*Intellectual Ventures II LLC* v. *Sprint Spectrum L.P. et al.*, Claim Construction Memorandum Opinion and Order, Civil Case No. 2:17-cv-662-JRG, U.S. District Court for the Eastern District of Texas, Marshall Division (Nov. 16, 2018).

(56) References Cited

OTHER PUBLICATIONS

*Intellectual Ventures II LLC* v. *Sprint Spectrum L.P. et al.*, Complaint, Civil Case No. 2:17-cv-662, U.S. District Court for the Eastern District of Texas, Marshall Division (Sep. 21, 2017).
*Intellectual Ventures II LLC* v. *Sprint Spectrum L.P. et al.*, Defendant Alcatel-Lucent USA, Inc.'s Answer and Affirmative Defenses, Civil Case No. 2:17-cv-662, U.S. District Court for the Eastern District of Texas, Marshall Division (Dec. 7, 2017).
*Intellectual Ventures II LLC* v. *Sprint Spectrum L.P. et al.*, Ericsson's Answer to IV's Complaint, Civil Case No. 2:17-cv-662-JRG, U.S. District Court for the Eastern District of Texas, Marshall Division (Oct. 8, 2018).
*Intellectual Ventures II LLC* v. *Sprint Spectrum L.P. et al.*, Intellectual Ventures II LLC's Answer to Alcatel-Lucent USA, Inc.'s Counterclaims, Civil Case No. 2:17-cv-662, U.S. District Court for the Eastern District of Texas, Marshall Division (Dec. 29, 2017).
*Intellectual Ventures II LLC* v. *Sprint Spectrum L.P. et al.*, Nokia of America Corporation's Answer and Affirmative Defenses, Civil Case No. 2:17-cv-662, U.S. District Court for the Eastern District of Texas, Marshall Division (Apr. 12, 2018).
*Intellectual Ventures II LLC* v. *Sprint Spectrum L.P. et al.*, Order, Civil Case No. 2:17-cv-662-JRG, U.S. District Court for the Eastern District of Texas, Marshall Division (Dec. 14, 2018).
*Intellectual Ventures II LLC* v. *Sprint Spectrum L.P. et al.*, Plaintiff Intellectual Ventures II LLC's Responses and Objections to the Sprint Defendants' First Set of Individual Interrogatories (No. 1-4), Civil Case No. 2:17-cv-662-JRG, U.S. District Court for the Eastern District of Texas, Marshall Division (Jun. 25, 2018).
*Intellectual Ventures II LLC* v. *Sprint Spectrum L.P. et al.*, Plaintiff Intellectual Ventures II LLC's Disclosure of Asserted Claims and Infringement Contentions under Patent Rule 3-1, Civil Case No. 2:17-cv-662-JRG, U.S. District Court for the Eastern District of Texas, Marshall Division (Feb. 27, 2019).
*Intellectual Ventures II LLC* v. *Sprint Spectrum L.P. et al.*, Sprint Spectrum L.P. and Nextel Operations, Inc.'s First Set of Individual Interrogatories (No. 1-4), Civil Case No. 2:17-cv-662-JRG, U.S. District Court for the Eastern District of Texas, Marshall Division (Feb. 27, 2019).
*Intellectual Ventures II LLC* v. *Sprint Spectrum L.P. et al.*, Sprint's Sealed Answer, Affirmative Defenses, and Counterclaims—Redacted, Civil Case No. 2:17-cv-662-JRG, U.S. District Court for the Eastern District of Texas, Marshall Division (Oct. 15, 2018).
*Intellectual Ventures II LLC* v. *T-Mobile USA Inc. et al.*, Ericsson's Answer to IV's Complaint, Civil Case No. 2:17-cv-661-JRG, U.S. District Court for the Eastern District of Texas, Marshall Division (Oct. 10, 2018).
*Intellectual Ventures II LLC* v. *T-Mobile USA Inc. et al.*, Nokia of America Corporation's First Set of Individual Interrogatories (No. 1-9), Civil Case No. 2:17-cv-661-JRG, U.S. District Court for the Eastern District of Texas, Marshall Division (Feb. 27, 2019).
*Intellectual Ventures II LLC* v. *T-Mobile USA Inc. et al.*, Plaintiff Intellectual Ventures II LLC's Answer to Nokia of America Corporation's Counterclaims for Declaratory Judgment, Civil Case No. 2:17-cv-661, U.S. District Court for the Eastern District of Texas, Marshall Division (Apr. 18, 2018).
*Intellectual Ventures II LLC* v. *T-Mobile USA Inc. et al.*, Plaintiff Intellectual Ventures II LLC's Responses and Objections to the T-Mobile Defendants' First Set of Individual Interrogatories (No. 1-5), Civil Case No. 2:17-cv-661-JRG, U.S. District Court for the Eastern District of Texas, Marshall Division (Feb. 27, 2019).
*Intellectual Ventures II LLC* v. *T-Mobile USA Inc. et al.*, Complaint, U.S. District Court for the Eastern District of Texas, Marshall Division, No. 2:17-cv-661 (Sep. 21, 2017).
*Intellectual Ventures II, LLC* v. *Sprint Spectrum L.P. et al.* and *Intellectual Ventures II, LLC* v. *T-Mobile USA, Inc. et al.*, Supplemental Expert Report of Kevin J. Negus, Ph.D. Regarding Invalidity of U.S. Pat. Nos. 8,953,641 and 8,897,828—Redacted, U.S. District Court for the Eastern District of Texas, Marshall Division, No. 2:17-cv-662-JRG and No. 2:17-cv-661-JRG (Feb. 11, 2019).
*Intellectual Ventures II, LLC* v. *Sprint Spectrum L.P. et al.* and *Intellectual Ventures II, LLC* v. *T-Mobile USA, Inc. et al.*, Expert Report of Kevin J. Negus, Ph.D. Regarding Invalidity of U.S. Pat. Nos. 8,953,641 and 8,897,828—Redacted, U.S. District Court for the Eastern District of Texas, Marshall Division, No. 2:17-cv-662-JRG and No. 2:17-cv-661-JRG (Dec. 12, 2018).
Joo et al., "The Uplink Subchannelization Preamble with Lower PAPR," IEEE C802.16d-04/25 (Mar. 11, 2004).
"Spreading Sequences for Multicarrier COMA Systems," IEEE Trans. Comm., vol. 47, No. 6, pp. 918-926 (1999), 9 pages.
*Ericsson Inc. et al.* v. *Intellectual Ventures II LLC*, Resume of Dr. Vijay K. Madisetti, Case IPR 2018-01689, U.S. Pat. No. 8,953,641, 29 pages (Sep. 4, 2018).
*Intellectual Ventures I LLC* v. *AT&T Mobility LLC et al.*, Memorandum Opinion and Claim Construction Order, dec. 1-13-cv-01668-378, 43 pages (Aug. 12, 2016).
Barber et al., "SS De-Registration," IEEE C802.16d-04/43 (Mar. 13, 2004).
Chang et al., "Blind Joint Channel and Data Estimation for OFDM Signals in Rayleigh Fading," IEEE (2001).
Cho et al., "New FEC structure suitable for CTC and mobile Cellular Operation of 802.16 OFDMA," IEE C802.16d-04-/23 (Mar. 11, 2004).
Coleri et al., "A Study of Channel Estimation in OFDM Systems," (2002).
Dowler et al., "Data-Derived Iterative Channel Estimation with Channel Tracking for a Mobile Fourth General Wide Area OFDM System," IEEE Globecom (2003).
IEEE Standard for Local and metropolitan area networks; Part 16: Air Interface for Fixed and Mobile Broadband Wireless Access Systems, IEEE Std 802.16-2001 (Apr. 8, 2002).
Joo et al., "OFDMA PHY AAS Enhancements," IEEE C802.16d-04/45r1 (Mar. 15, 2004).
Thomas et al., "Broadband MIMO-OFDM Channel Estimation via Near-Maximum Likelihood Time of Arrival Estimate," IEEE (2002).
*Continental Automotive Systems, Inc.*, v. *Intellectual Ventures II LLC*, Petitioner's Reply, U.S. Pat. No. 8,953,641, IPR 2022-00974 (Jun. 30, 2023).
*Continental Automotive Systems, Inc.*, v. *Intellectual Ventures II LLC*, Supplemental Declaration of Dr. Robert Akl, U.S. Pat. No. 8,953,641, IPR 2022-00974 (Jun. 30, 2023).
Wang et al., "MIMO-OFDM Channel Estimation via Probabilistic Data Association Based TOAs," IEEE Globecom (2003).
*Continental Automotive Systems, Inc.*, v. *Intellectual Ventures II LLC*, Final Written Decision Determining All Challenged Claims Unpatentable, IPR 2022-00974, U.S. Pat. No. 8,953,641 B3 (Dec. 5, 2023).

METHODS AND APPARATUS FOR MULTI-CARRIER COMMUNICATIONS WITH VARIABLE CHANNEL BANDWIDTH

CROSS-REFERENCE TO RELATED APPLICATIONS

This application is a continuation of U.S. patent application Ser. No. 16/715,995, filed on Dec. 16, 2019, which is continuation of U.S. patent application Ser. No. 15/727,831, filed on Oct. 9, 2017, which issued as U.S. Pat. No. 10,511,417 on Dec. 17, 2014, which is continuation of U.S. patent application Ser. No. 14/505,913 filed on Oct. 2, 2014, which is now abandoned, which is divisional of U.S. patent application Ser. No. 12/870,617, filed on Aug. 27, 2010, which issued as U.S. Pat. No. 8,953,641 on Feb. 10, 2015 which is a continuation of U.S. patent application Ser. No. 10/583,534, filed on Jun. 5, 2007, which issued as U.S. Pat. No. 7,787,431 on Aug. 31, 2010, claiming the benefit of PCT/US2005/14828, filed on Apr. 29, 2005, and U.S. Provisional Patent Application No. 60/567,233, filed on May 1, 2004, which are all incorporated by reference in their entirety.

BACKGROUND

While it is ideal for a broadband wireless communication device to be able to roam from one part of the world to another, wireless communication spectra are heavily regulated and controlled by individual countries or regional authorities. It also seems inevitable that each country or region will have its own different spectral band for broadband wireless communications. Furthermore, even within a country or region, a wireless operator may own and operate on a broadband spectrum that is different in frequency and bandwidth from other operators. The existing and future bandwidth variety presents a unique challenge in designing a broadband wireless communication system and demands flexibility and adaptability.

Multi-carrier communication systems are designed with a certain degree of flexibility. In a multi-carrier communication system such as multi-carrier code division multiple access (MC-CDMA) and orthogonal frequency division multiple access (OFDMA), information is multiplexed on subcarriers that are mutually orthogonal in the frequency domain. Design flexibility is a result of the ability to manipulate parameters such as the number of subcarriers and the sampling frequency. For example, by using a different sampling frequency, a DVB-T (Digital Video Broadcasting-Terrestrial) device is capable of receiving signals broadcasted from a DVB-T station that is operating on a 6-, 7-, or 8-MHz bandwidth.

However, the change in the time-domain structure brings about a series of system problems. A varying sampling rate alters the symbol length, frame structure, guard time, prefix, and other time-domain properties, which adversely affects the system behavior and performance. For example, the MAC layer and even the layers above have to keep track of all the time-domain parameters in order to perform other network functions such as handoff, and thereby the complexity of the system will exponentially increase. In addition, the change in symbol length causes control and signaling problems and the change in the frame structure may cause unacceptable jitters in some applications such as voice over IP. A practical and feasible solution for multi-carrier communication with variable channel bandwidth is desirable.

DETAILED DESCRIPTION

The multi-carrier system mentioned here can be of any format such as OFDM, or Multi-Carrier Code Division Multiple Access (MC-CDMA). The presented methods can also be applied to downlink, uplink, or both, where the duplexing technique is either Time Division Duplexing (TDD) or Frequency Division Duplexing (FDD).

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above,"

"below" and words of similar import, when used in this application, shall refer to this application as a whole and not to any particular portions of this application. When the claims use the word "or" in reference to a list of—4 two or more items, that word covers all of the following interpretations of the word: any of the items in the list, all of the items in the list and any combination of the items in the list.

Multi-Carrier Communication System

Figure 1:
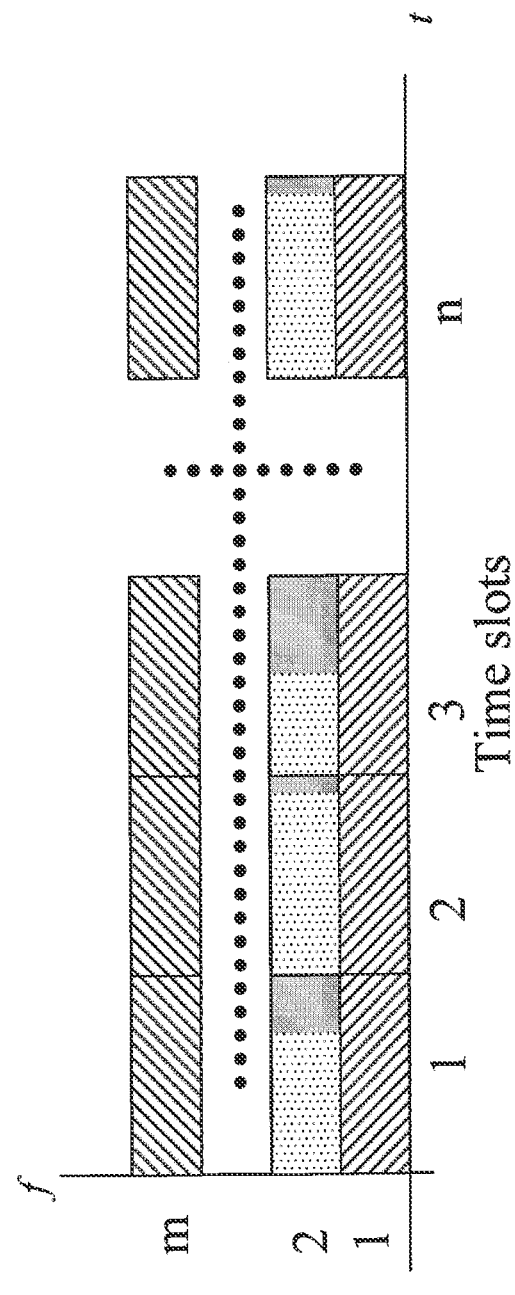
FIG. 1 is a schematic presentation of a radio resource divided into small units in both the frequency and time domains: subchannels and time slots.

The physical media resource (e.g., radio or cable) in a multi-carrier communication system can be divided in both the frequency and time domains. This canonical division provides a high flexibility and fine granularity for resource sharing. FIG. 1 presents a radio resource divided into small units in both the frequency and time domains—subchannels and time slots. The subchannels are formed by subcarriers.

Figure 2:
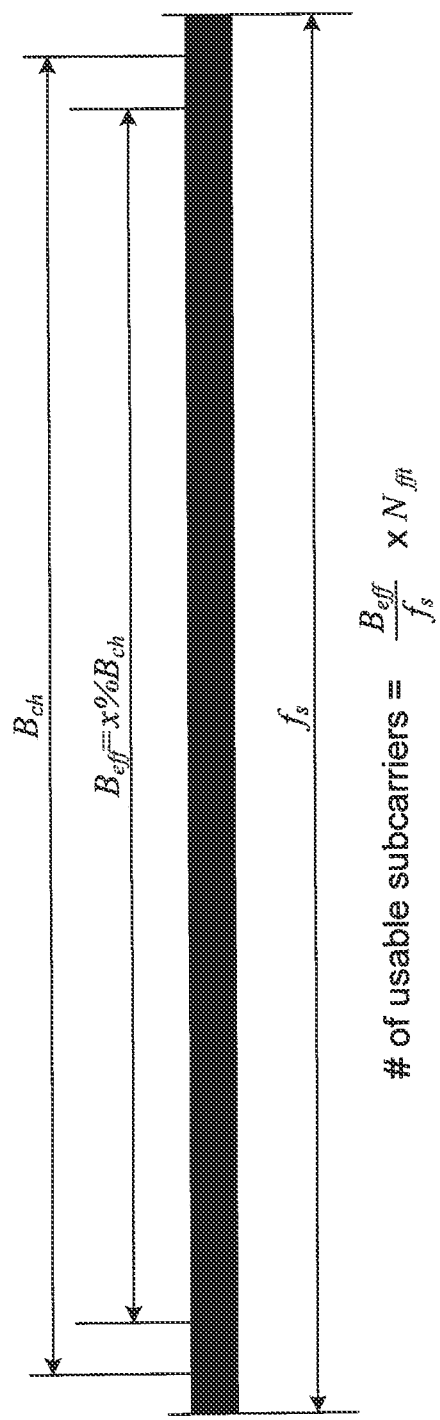
FIG. 2 illustrates a relationship between sampling frequency, channel bandwidth, and usable subcarriers.

The basic structure of a multi-carrier signal in the frequency domain is made up of subcarriers. For a given bandwidth of a spectral band or channel ($B_{ch}$) the number of usable subcarriers is finite and limited, whose value depends on a size of an FFT (Fast Fourier Transform) employed, a sampling frequency (f), and an effective bandwidth ($B_{eff}$). FIG. 2 illustrates a schematic relationship between the sampling frequency, the channel bandwidth, and the usable subcarriers. As shown, the Beff is a percentage of Bch.

Figure 3:
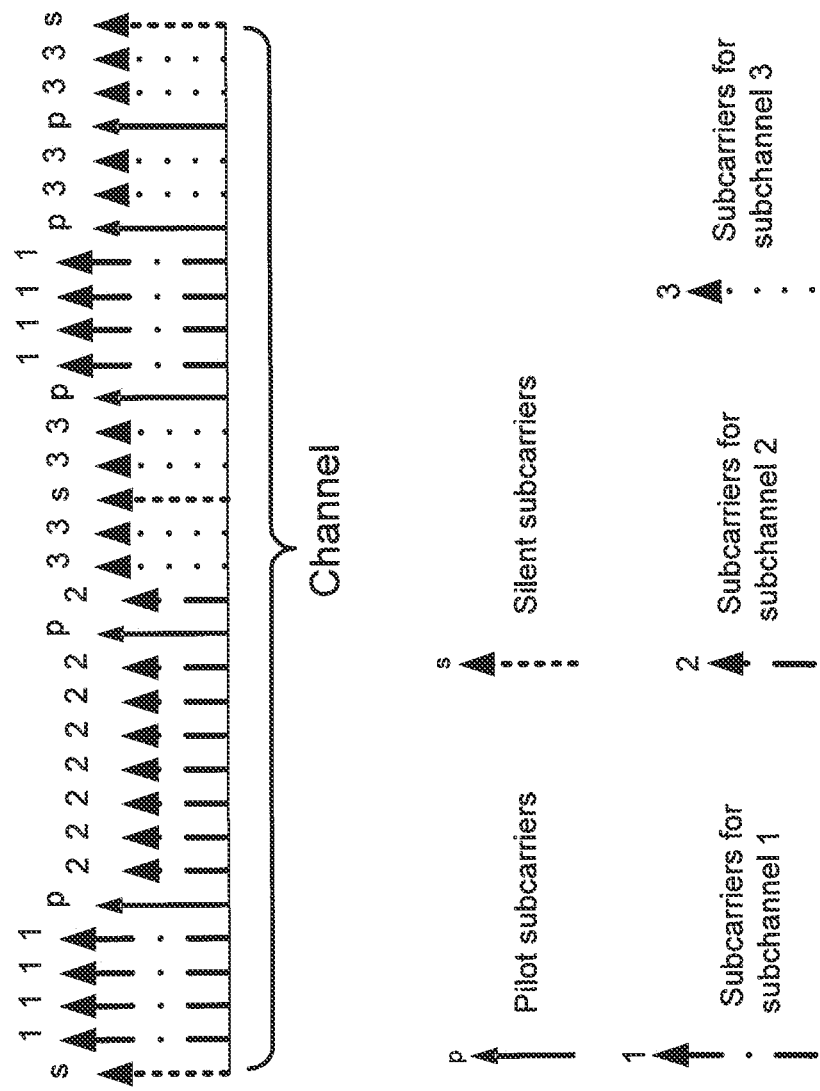
FIG. 3 shows a basic structure of a multi-carrier signal in the frequency domain, made up of subcarriers.

A basic structure of a multi-carrier signal in the frequency domain is made up of subcarriers and, illustrated in FIG. 3, which shows three types of subcarriers as follow:

1. Data subcarriers, which carry information data;
2. Pilot subcarriers, whose phases and amplitudes are predetermined and made known to all receivers, and which are used for assisting system functions such as estimation of system parameters; and
3. Silent subcarriers, which have no energy and are used as guard bands and DC carriers.

The data subcarriers can be arranged into groups called subchannels to support scalability and multiple-access. Each subchannel may be set at a different power level. The subcarriers forming one subchannel may or may not be adjacent to each other. Each user may use some or all of the subchannels. A subchannel formed by the contiguous subcarriers is called a congregated or clustered subchannel. A congregated subchannel may have a different power level from others.

Figure 4:
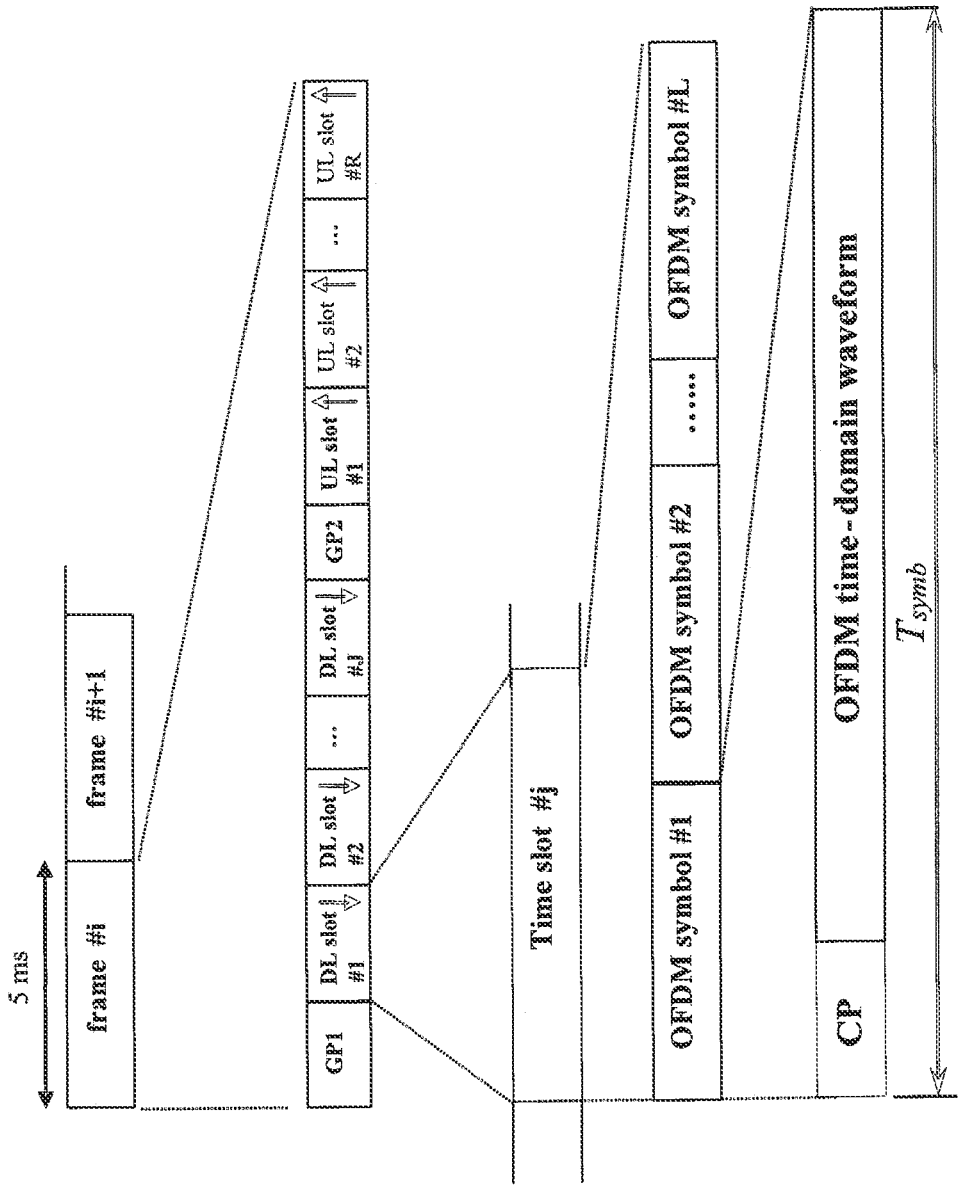
FIG. 4 shows a basic structure of a multi-carrier signal in the time domain, generally made up of time frames, time slots, and OFDM symbols.

FIG. 4 illustrates the basic structure of a multi-carrier signal in the time domain which is generally made up of time frames, time slots, and OFDM symbols. A frame consists of a number of time slots, whereas each time slot is comprised of one or more OFDM symbols. The OFDM time domain waveform is generated by applying the inverse-fast-Fourier-transform (IFFT) to the OFDM signals in the frequency domain. A copy of the last portion of the time waveform, known as the cyclic prefix (CP), is inserted at the beginning of the waveform itself to form an OFDM symbol.

The downlink transmission in each frame begins with a downlink preamble, which can be the first or more of the OFDM symbols in the first downlink (DL) slot. The DL preamble is used at a base station to broadcast radio network information such as synchronization and cell identification.

Similarly, uplink transmission can begin with an uplink preamble, which can be the first or more of the OFDM symbols in the first uplink (UL) slot. The UL preamble is used by mobile stations to carry out the functions such as initial ranging during power up and handoff, periodic ranging and bandwidth request, channel sounding to assist downlink scheduling or advanced antenna technologies, and other radio functions.

Cellular Wireless Networks

Figure 5:
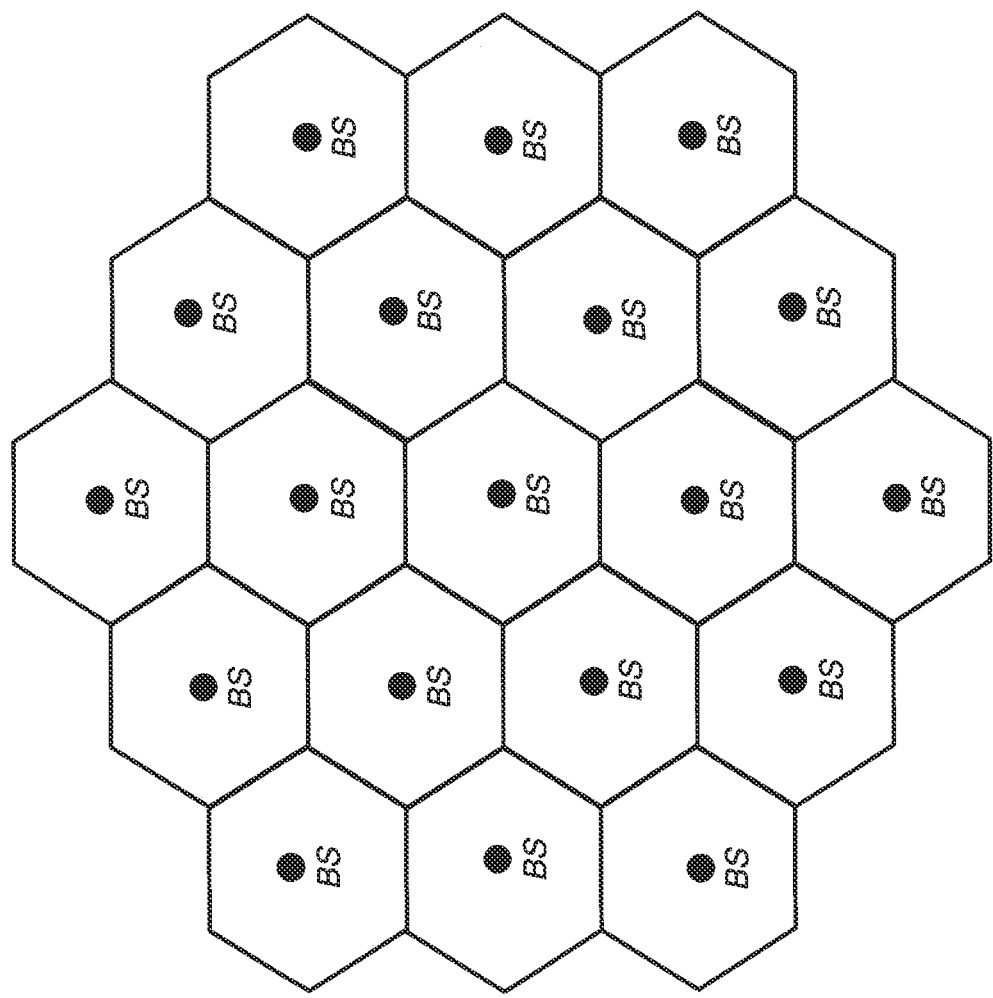
FIG. 5 shows a cellular wireless network comprised of a plurality of cells, wherein in each of the cells coverage is provided by a base station (BS).

In a cellular wireless network, the geographical region to be serviced by the network is normally divided into smaller areas called cells. In each cell the coverage is provided by a base station. This type of structure is normally referred to as the cellular structure. FIG. 5 depicts a cellular wireless network comprised of a plurality of cells. In each of these cells the coverage is provided by a base station (BS).

A base station is connected to the backbone of the network via a dedicated link and also provides radio links to the mobile stations within its coverage. Within each coverage area, there are located mobile stations to be used as an interface between the users and the network. A base station also serves as a focal point to distribute information to and collect information from its mobile stations by radio signals. If a cell is divided into sectors, from system engineering point of view each sector can be considered as a cell. In this context, the terms "cell" and "sector" are interchangeable.

Variable Bandwidth OFDMA

In accordance with aspects of certain embodiments of the invention, a variable bandwidth system is provided, while the time-domain signal structure (such as the OFDM symbol length and frame duration) is fixed regardless of the bandwidths. This is achieved by keeping the ratio constant between the sampling frequency and the length of FFT/IFFT. Equivalently, the spacing between adjacent subcarriers is fixed.

In some embodiments, the variable channel bandwidth is realized by adjusting the number of usable subcarriers. In the frequency domain, the entire channel is aggregated by subchannels. (The structure of a subchannel is designed in a certain way to meet the requirements of FEC (Forward Error Correction) coding and, therefore, should be maintained unchanged.) However, the number of subchannels can be adjusted to scale the channel in accordance with the given bandwidth. In such realization, a specific number of subchannels, and hence the number of usable subcarriers, constitute a channel of certain bandwidth.

Figure 6:
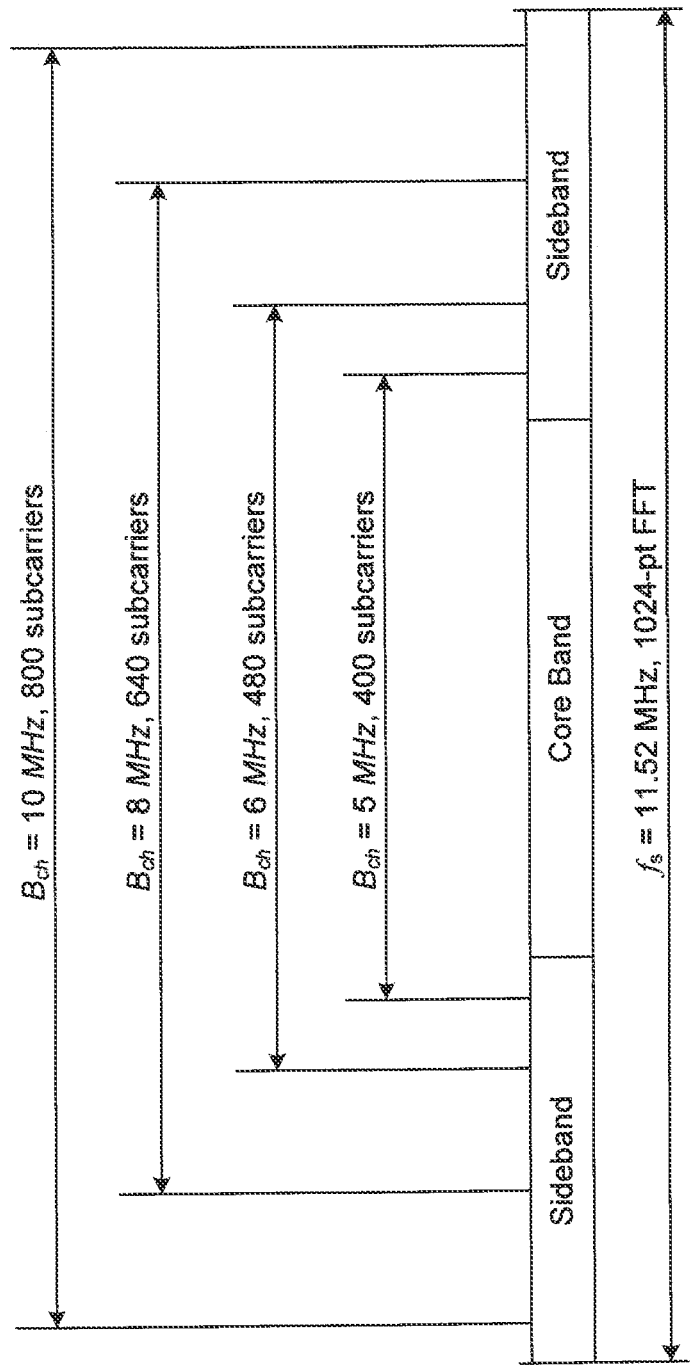
FIG. 6 illustrates a variable channel bandwidth being realized by adjusting a number of usable subcarriers, whose spacing is set constant.

For example, FIG. 6 illustrates the signal structure in the frequency domain for a communication system with parameters specified in Table 1 below. The numbers of usable subcarriers are determined based on the assumption that the effective bandwidth $B_{eff}$ is 90% of the channel bandwidth $B_{ch}$. The variable channel bandwidth is realized by adjusting the number of usable subcarriers, whose spacing is set constant. The width of a core-band is less than the smallest channel bandwidth in which the system is to operate.

TABLE 1

Sample System Parameters

| | | | | |
|---|---|---|---|---|
| Sampling freq. | | 11.52 MHz | | |
| FFT size | | 1024 points | | |
| Subcarrier spacing | | 11.25 kHz | | |
| Channel bandwidth | 10 MHz | 8 MHz | 6 MHz | 5 MHz |
| # of usable subcarriers | 800 | 640 | 480 | 400 |

Figure 7:
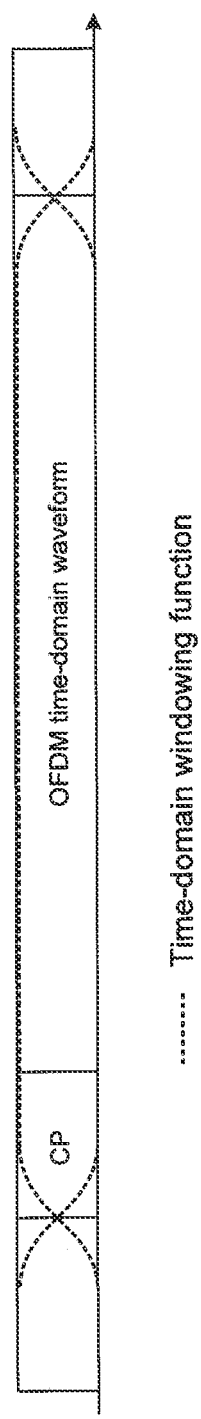
FIG. 7 depicts a time-domain windowing function applied to OFDM symbols to shape the OFDM spectrum to conform to a given spectral mask.

In this realization, using the invariant OFDM symbol structure allows the use of same design parameters for signal manipulation in the time-domain for a variable bandwidth. For example, in an embodiment depicted in FIG. 7, a particular windowing design shapes the spectrum to conform to a given spectral mask and is independent of the operating bandwidth.

Radio Operation Via Core-Band

To facilitate the user terminals to operate in a variable bandwidth (VB) environment, specific signaling and control methods are required. Radio control and operation signaling is realized through the use of a core-band (CB). A core-band, substantially centered at the operating center frequency, is defined as a frequency segment that is not greater than the smallest operating channel bandwidth among all the possible spectral bands that the receiver is designed to operate with. For example, for a system that is intended to work at 5-, 6-, 8-, and 10-Mhz, the width of the CB can be 4 MHz, as shown in FIG. 6. The rest of the bandwidth is called sideband (SB).

In one embodiment relevant or essential radio control signals such as preambles, ranging signals, bandwidth request, and/or bandwidth allocation are transmitted within the CB. In addition to the essential control channels, a set of data channels and their related dedicated control channels are placed within the CB to maintain basic radio operation. Such a basic operation, for example, constitutes the primary state of operation. When entering into the network, a mobile station starts with the primary state and transits to the normal full-bandwidth operation to include the sidebands for additional data and radio control channels.

Figure 8:
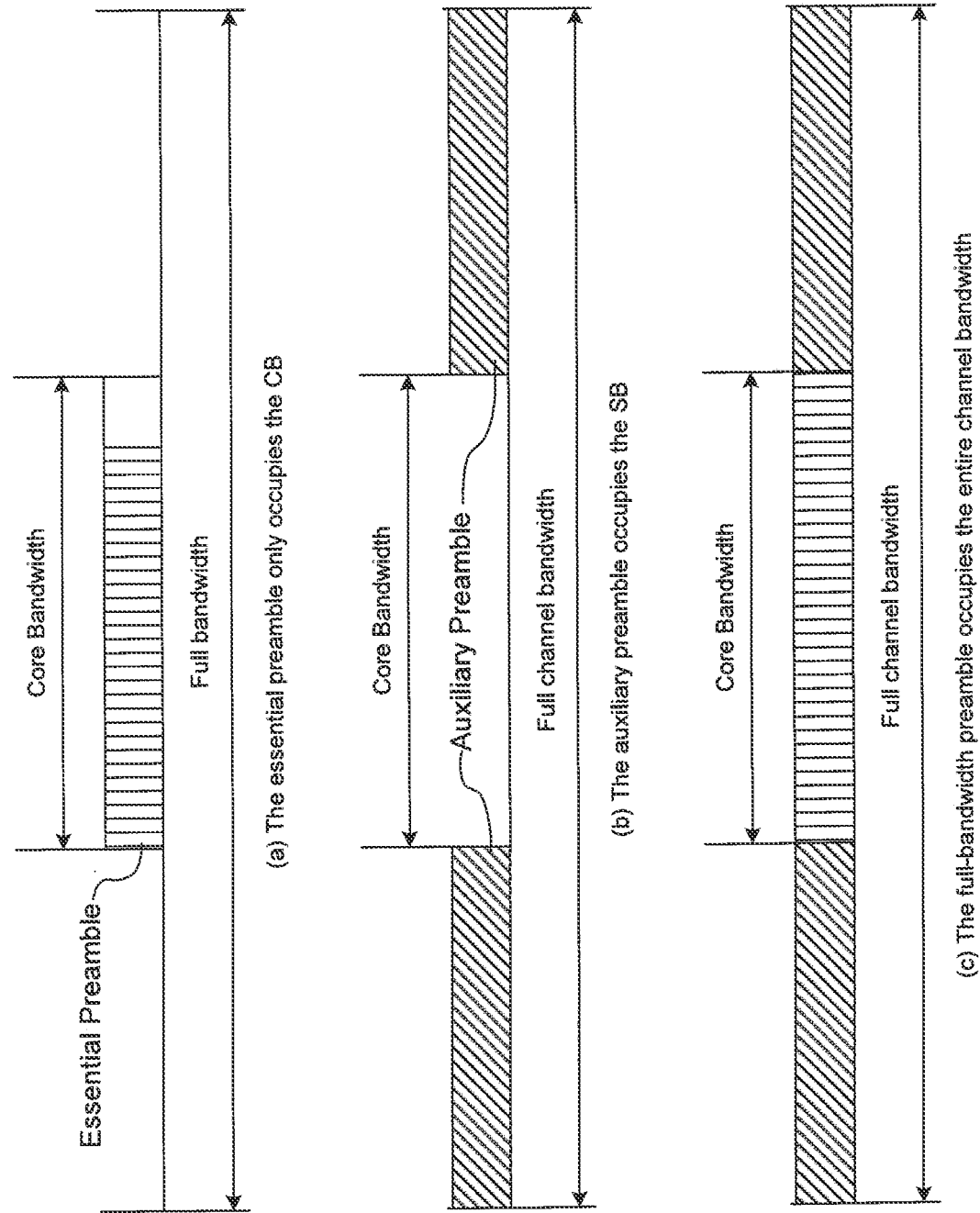
FIG. 8 depicts a preamble designed to occupy either an entire operating bandwidth or a core-band.

In another embodiment, a preamble, called an essential, or primary preamble (EP), is designed to only occupy the CB, as depicted in FIG. 8. The EP alone is sufficient for the basic radio operation. The EP can be either a direct sequence in the time domain with its frequency response confined within the CB, or an OFDM symbol corresponding to a particular pattern in the frequency domain within the CB. In either case, an EP sequence may possess some or all of the following properties:
1. Its autocorrelation exhibits a relatively large ratio between the correlation peak and sidelobe levels.
2. Its cross-correlation coefficient with another EP sequence is significantly small with respect to the power of the EP sequences.
3. Its peak-to-average ratio is relatively small.
4. The number of EP sequences that exhibit the above three properties is relatively large.

In yet another embodiment, a preamble, called an auxiliary preamble (AP), which occupies the SB, is combined with the EP to form a full-bandwidth preamble (FP) (e.g., appended in the frequency domain or superimposed in the time domain). An FP sequence may possess some or all of the following properties:
1. Its autocorrelation exhibits a relatively large ratio between the correlation peak and sidelobe levels.
2. Its cross-correlation coefficient with another FP sequences is significantly small with respect to the power of the FP sequences.
3. Its peak-to-average ratio is relatively small.
4. The number of FP sequences that exhibits the above three properties is relatively large.

In still another embodiment, the formation of an FP by adding an AP allows a base station to broadcast the FP, and a mobile station to use its corresponding EP, to access this base station. An FP sequence may also possess some or all of the following properties:
1. Its correlation with its own EP exhibits a relatively large ratio between the correlation peak and sidelobe levels.
2. Its cross-correlation coefficient with any EP sequence other than its own is significantly small with respect to its power.
3. The number of FP sequences that exhibit the above two properties is relatively large.

Automatic Bandwidth Recognition

The VB-OFDMA receiver is capable of automatically recognizing the operating bandwidth when it enters in an operating environment or service area of a particular frequency and channel bandwidth. The bandwidth information can be disseminated in a variety of forms to enable Automatic Bandwidth Recognition (ABR).

In one embodiment, a mobile station, when entering in an environment or an area that supports the VB operation or services, will scan the spectral bands of different center frequencies. If it detects the presence of a signal in a spectral band of a particular center frequency by using envelope detection, received signal strength indicator (RSSI), or by other detection methods, it can determine the operating channel bandwidth by bandwidth-center frequency association such as table lookup. For example, a table such as Table 2 is stored in the receiver. Based on the center frequency that it has detected, the mobile station looks up the value of the channel bandwidth from the table.

TABLE 2

Sample Center Frequency and Corresponding Bandwidth

| Center frequency | Channel Bandwidth |
| --- | --- |
| 2.31 GHz | 10 MHz |
| 2.56 GHz | 6 MHz |
| 2.9 G | 8 MHz |

In another embodiment, the system provides the bandwidth information via downlink signaling, such as using a broadcasting channel or a preamble. When entering into a VB network, the mobile stations will scan the spectral bands of different center frequencies in which the receiver is designed to operate and decode the bandwidth information contained in the broadcasting channel or preamble.

Multi-Mode (Multi-Range) VB-OFDMA

In accordance with the principles of this invention, multi-modes are devised for a VB-OFDMA system to handle an exceptionally wide range of variation in channel bandwidth. The entire range of bandwidth variation is divided into smaller parts—not necessarily in equal size—each of which will be dealt with as a separate mode or range.

Figure 9:
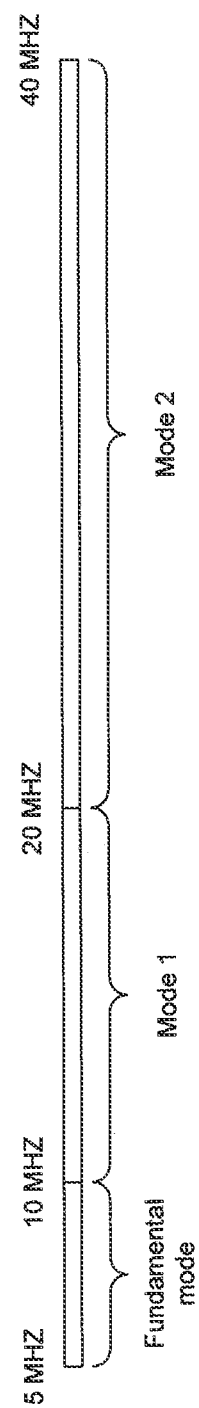
FIG. 9 shows an entire range (e.g., from 5 Mhz to 40 MHz) of bandwidth variation being divided into smaller groups or trunks (e.g., 5-10 MHz, 10-20 MHz, 20-40 MHz, in sizes), wherein each trunk is handled in one particular range.

FIG. 9 illustrates the entire range (e.g., from 5 MHz to 40 MHz) of bandwidth variation being divided into smaller parts (e.g., 5-10 MHz, 10-20 MHz, 20-40 MHz, in sizes). Each part is handled in one particular mode. The mode for the lowest range of bandwidth is labeled as "fundamental mode" and other modes are called "higher modes" (Mode 1, Mode 2, etc.).

The sampling frequency of a higher mode is higher than the sampling frequency of the fundamental mode. In one embodiment the sampling frequency of a higher mode is a multiple of the sampling frequency of the fundamental mode. In this embodiment, in the higher modes, the FFT size can be multiplied in accordance with the sampling frequency, thereby maintaining the time duration of the OFDM symbol structure. For example, the parameters for the case of a multi-mode design are given in Table 3. Alternatively, a higher mode can be realized by maintaining the FFT size and shortening the OFDM symbol duration accordingly. For example, for Mode 1 in Table 3, the FFT size can be maintained at 1024, whereas the sampling frequency is doubled and the symbol length is a half of that for the fundamental range. Yet another higher-mode realization is to both increase the FFT size and shorten the symbol duration accordingly. For example, for Mode 2 (20 MHz to 40 MHz in bandwidth), both the FFT size and the sampling frequency can be doubled as those of the fundamental range, whereas the symbol length is halved as that of the fundamental range. The width of the CB in a multi-mode VB-OFDMA system may not be greater than the smallest bandwidth in the fundamental mode.

TABLE 3

Sample System Parameters

| | Mode 1 | Fundamental-Mode |
|---|---|---|
| Sampling freq. | 23.04 MHz | 11.52 MHz |
| FFT size | 2048 points | 1024 points |
| Subcarrier | 11.25 kHz spacing | |
| Channel bandwidth | 20  18  15  12 | 10  8  6  5 |
| # of usable subcarriers | 1600  1440  1200  960 | 800  680  480  400 |

Figure 10:
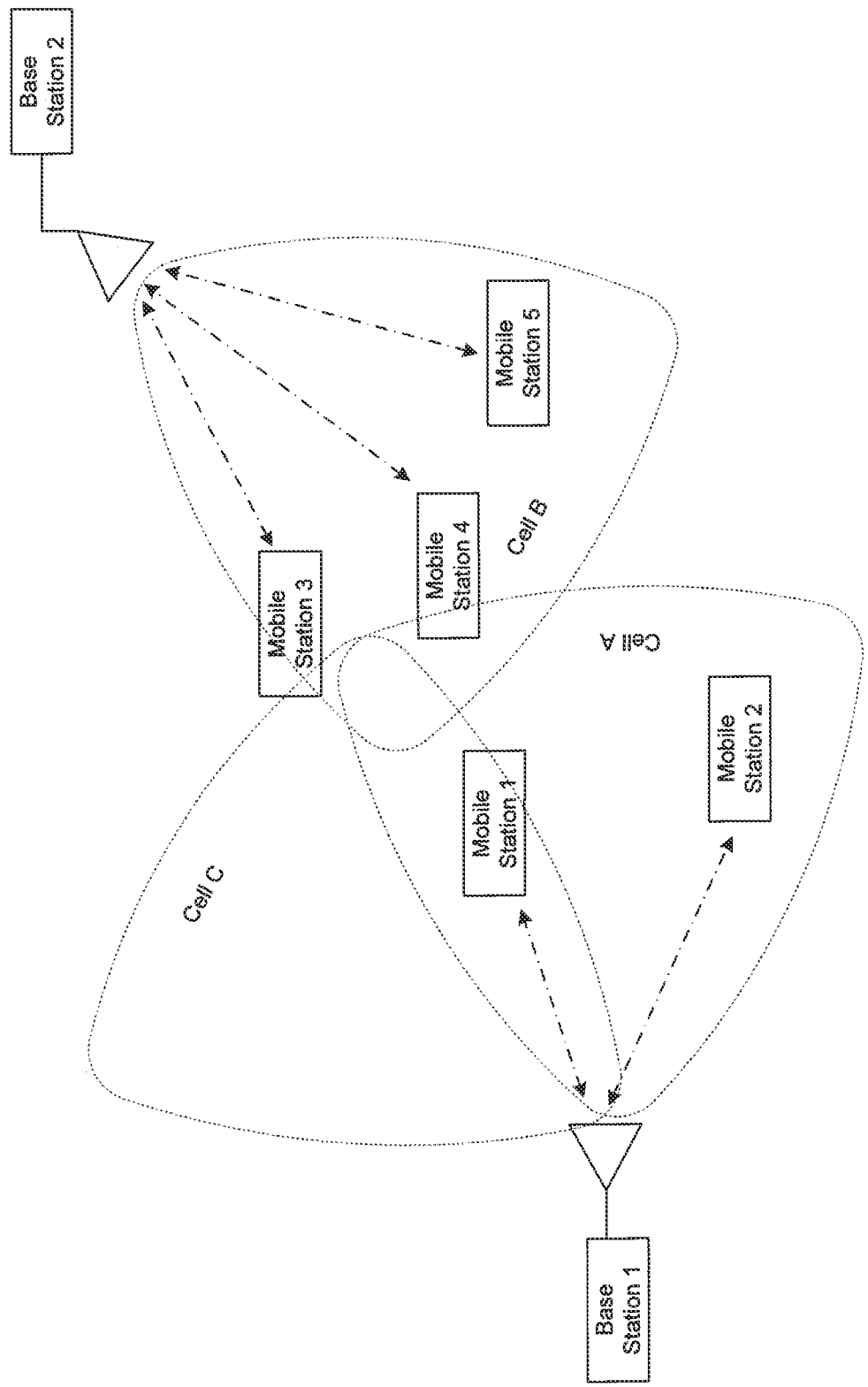
FIG. 10 illustrates a multi-cell, multi-user cellular system comprising multiple base stations and mobile stations.

FIG. 10 illustrates a multi-cell, multi-user cellular system comprising multiple base stations and mobile stations. The system of FIG. 10 is an example of an environment in which the attributes of the invention can be utilized.

While specific circuitry may be employed to implement the above embodiments, aspects of the invention can be implemented in a suitable computing environment. Although not required, aspects of the invention may be implemented as computer-executable instructions, such as routines executed by a general-purpose computer, e.g., a server computer, wireless device or personal computer. Those skilled in the relevant art will appreciate that aspects of the invention can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the term "computer" refers to any of the above devices and systems, as well as any data processor.

Aspects of the invention can be embodied in a special purpose computer or data processor that is specifically programmed, configured, or constructed to perform one or more of the processes explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

The above detailed description of the embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes are presented in a given order, alternative embodiments may perform routines having steps in a different order, and some processes may be deleted, moved, added, subdivided, combined, and/or modified. Each of these processes may be implemented in a variety of different ways.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, and the U.S. application Ser. No. 11/568,385 entitled "Methods and Apparatus for Communication with Time-Division Duplexing," filed Oct. 26, 2006, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A mobile station using orthogonal frequency division multiple access (OFDMA), the mobile station comprising:
    frequency processing circuitry; and
    a processor, wherein:
    the frequency processing circuitry and the processor are configured to scan spectral bands for a first signal, the first signal being a broadcast signal having bandwidth information, the first signal received in a first bandwidth of cell and using a first Fast Fourier Transform (FFT) size;
    the frequency processing circuitry and the processor configured to receive and process the broadcast signal in the first bandwidth; and
    the frequency processing circuitry and the processor configured to switch to receive and process a second bandwidth using a second FFT size, the second bandwidth being of different frequency size than the first bandwidth and the second FFT size being the same as the first FFT size.

2. The mobile station of claim 1 wherein the second bandwidth has a different OFDM symbol duration than the first bandwidth.

3. The mobile station of claim 2 wherein the second bandwidth has a different sampling frequency than the first bandwidth.

4. The mobile station of claim 1 wherein the first bandwidth and the second bandwidth have a same subcarrier spacing.

5. A method performed by a mobile station, the method comprising:
    scanning spectral bands for a first signal, the first signal being a broadcast signal having bandwidth information, the first signal received in a first bandwidth of cell and using a first Fast Fourier Transform (FFT) size;
    receiving and processing the broadcast signals in a first bandwidth; and
    switching to receiving and processing a second bandwidth using a second FFT size, the second bandwidth being different frequency size than the first bandwidth and the second FFT size being the same as the first FFT size.

6. The method of claim 5 wherein the second bandwidth has a different OFDM symbol duration than the first bandwidth.

7. The method of claim 6 wherein the second bandwidth has a different sampling frequency than the first bandwidth.

8. The method of claim 5 wherein the first bandwidth and the second bandwidth have a same subcarrier spacing.

9. A base station comprising:
    frequency processing circuitry; and
    a processor, wherein:
    the frequency processing circuitry and the processor are configured to transmit a first signal, the first signal being a broadcast signal having bandwidth information, the first signal is transmitted in a first bandwidth of cell and using a first Fast Fourier Transform (FFT) size;
    the frequency processing circuitry and the processor configured to transmit and process the broadcast signals in the first bandwidth; and
    the frequency processing circuitry and the processor configured to switch to transmit using a second bandwidth using a second FFT size for a mobile station, the second bandwidth being of different frequency size than the first bandwidth and the second FFT size being the same as the first FFT size.

10. The base station of claim 9 wherein the second bandwidth has a different OFDM symbol duration than the first bandwidth.

11. The base station of claim 10 wherein the second bandwidth has a different sampling frequency than the first bandwidth.

12. The base station of claim 9 wherein the first bandwidth and the second bandwidth have a same subcarrier spacing.

* * * * *